Patented Nov. 13, 1934

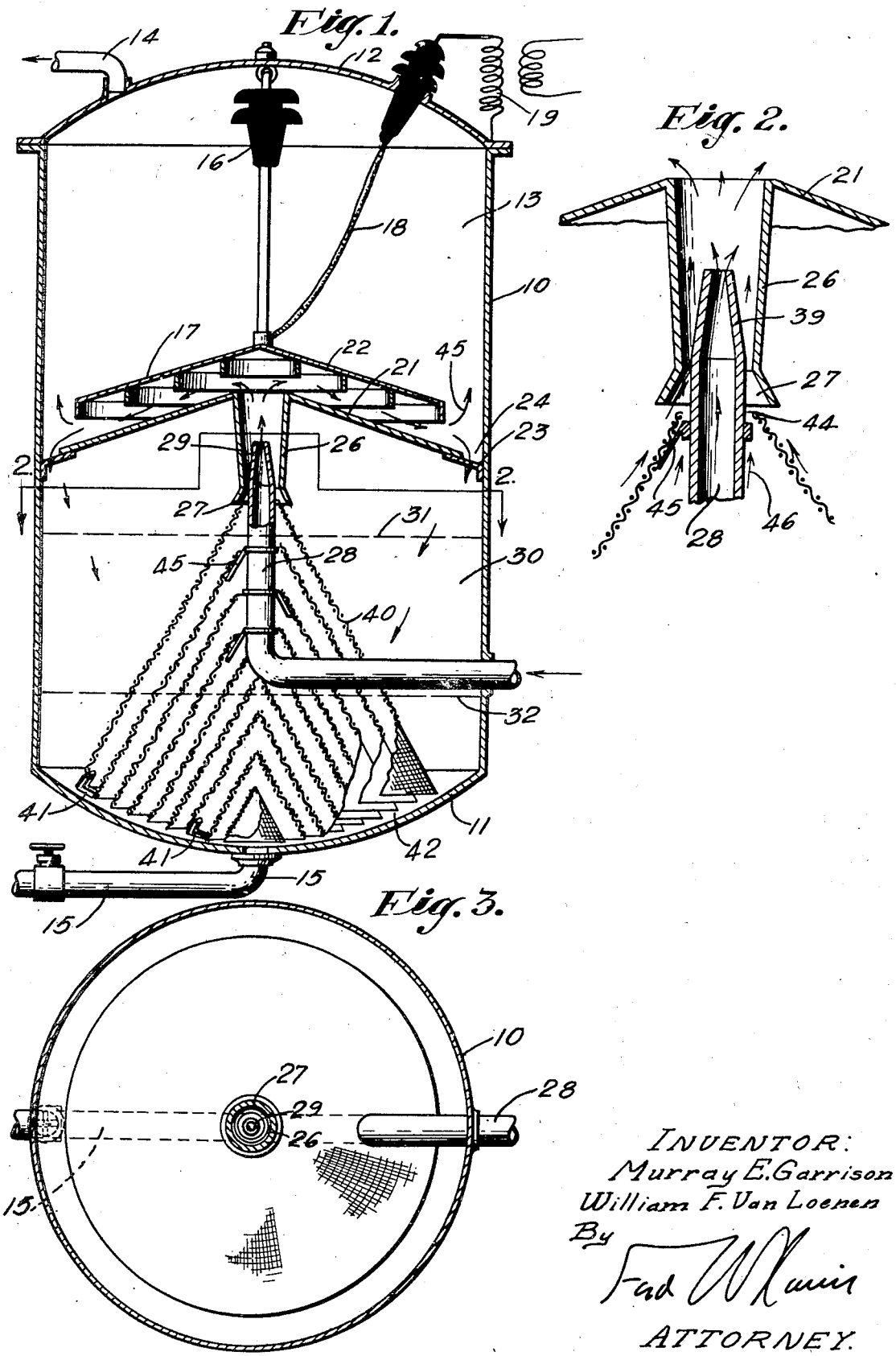

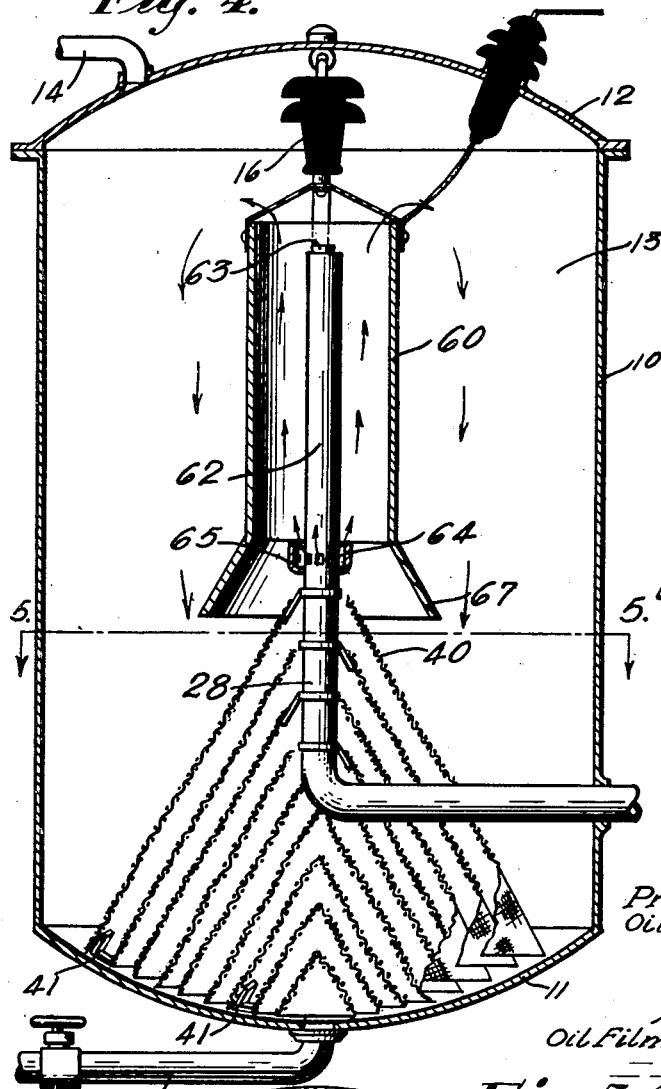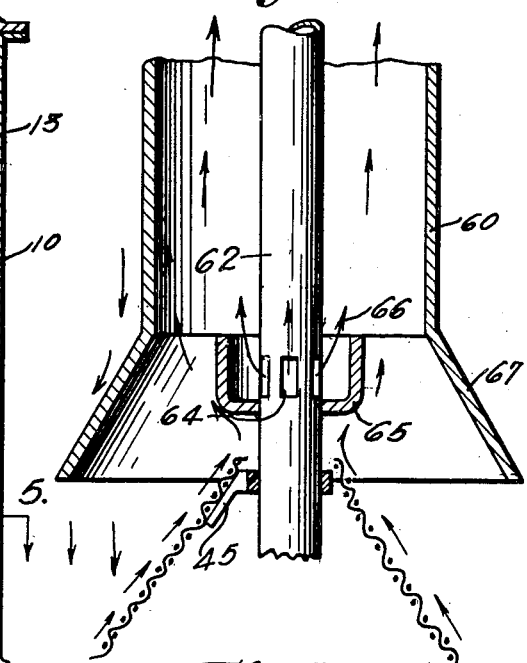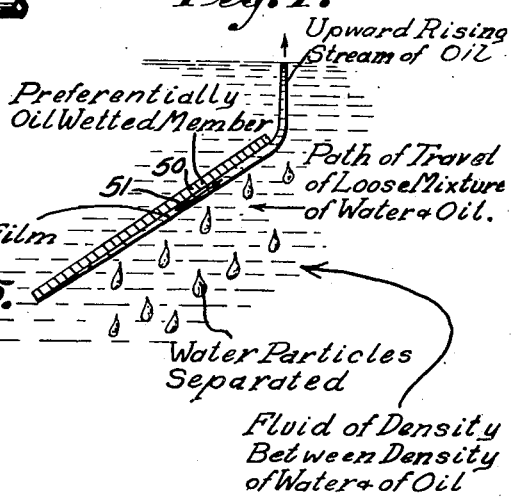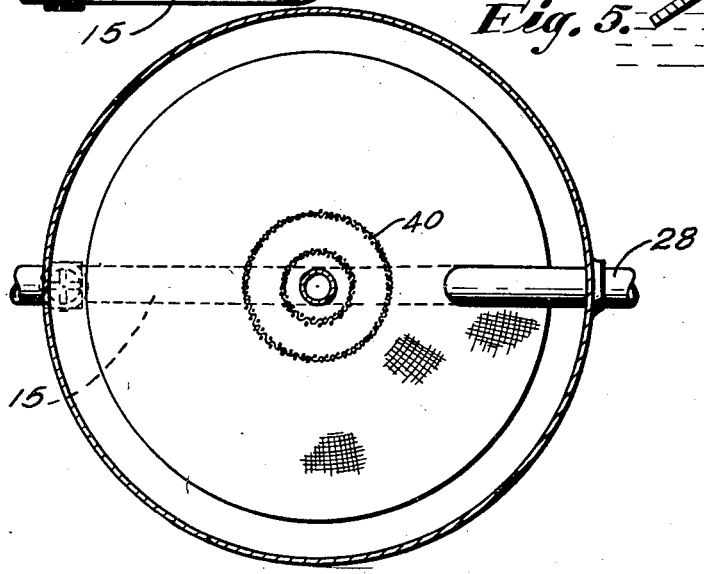

1,980,722

UNITED STATES PATENT OFFICE 1,980,722

METHOD OF AND APPARATUS FOR AGGLOMERATING SUSPENDED PARTICLES

Murray E. Garrison, Long Beach, Calif., and William F. Van Loenen, Casper, Wyo., assignors to Petroleum Rectifying Company of California, Los Angeles, Calif., a corporation of California Application March 18, 1930, Serial No. 436,733

16 Claims. (Cl. 204—24)

Our invention relates to separating devices, and more particularly to a separating device which finds particular utility in separating the phases of a coarse emulsion, or the constituents of a treated petroleum emulsion.

Petroleum as it comes from the well is often associated with minute particles of water which must be separated therefrom before the petroleum can be commercially marketed. The breaking of such emulsions is usually accomplished by chemical, electrical, or mechanical means. Certain chemicals, when added to such an emulsion, tend to break down or neutralize the emulsifying agent present therein, thereby making it possible to subsequently separate the constituents by prolonged settling. So also, prolonged settling is necessary in electrical dehydration methods wherein the dispersed particles are agglomerated into masses of sufficient size to subsequently gravitate from the liquid forming the continuous phase. In addition, certain processes in which a mechanical action takes place are also effective in agglomerating the dispersed phase, but require a subsequent settling step to separate the agglomerated particles.

The present invention finds particular utility in assisting the separation of the constituents or phases of treated emulsions, whether or not these emulsions are treated by mechanical, electrical or chemical means, and is valuable not only in effecting a very clear separation, but is primarily effective in the saving of considerable time which is now required for the settling step. It should, however, be understood that our process and apparatus are not limited to the separation of the constituents of a treated petroleum emulsion, but comprehend also the separation of the constituents of other mixtures.

It is primarily an object of this invention to provide a novel method of separating constituents of a mixture which is much more rapid than the conventional gravitational settling methods.

The particular use of our method and apparatus which we have chosen to disclose in detail herein is in conjunction with an electric treater including a pair of electrodes which defines a treating space and between which a high electric potential is impressed. The emulsion to be treated is usually of the water-in-oil type in which the water phase is dispersed throughout the oil phase in the form of droplets which are often microscopic in size. When the emulsion is subjected to a high intensity electric field the minute droplets agglomerate into masses of sufficient size to subsequently gravitate from the oil when allowed to settle. During such settling it has been found that the mixture stratifies into an upper layer of dry oil and a lower layer of water, with a liquid therebetween which is often termed "bottom settlings", but which will hereinafter be termed an "auxiliary liquid". This auxiliary liquid is of a density between the densities of the oil and water and is usually in the form of a coarse emulsion, the composition of which varies throughout the height of this body of auxiliary liquid. At the upper section thereof it may consist of a loose water-in-oil emulsion plus free oil and water, as well as having some smaller bodies of unbroken emulsion therein. At the lower section thereof the water predominates and free oil and emulsion is found to be suspended in the water.

Our experiments have shown that if an interstitial member is disposed in this auxiliary liquid in a vertical or inclined position, and the treated emulsion which forms the mixture to be broken is introduced into this body of auxiliary liquid and brought into contact with the interstitial member, a film of oil will be formed on the interstitial wall which will cover all or a portion of the interstices. This stream of oil rises along the interstitial member due to the density thereof being less than the density of the surrounding auxiliary liquid. The water is forced through this film of oil, and through the interstices of the member, and is collected at a point on the opposite side of this member.

It is an object of this invention to provide a method of and apparatus for separating a mixture into its constituents by bringing the mixture into contact with a member in the presence of an auxiliary liquid, the density of which is different from the respective densities of the constituents.

A further object of the invention is to provide an interstitial member of this character which is formed of a material which presents a surface which has a particular affinity for one constituent of the mixture, or which is, in other words, preferentially wetted by this constituent, usually the oil when separating a treated petroleum emulsion.

A further object of the invention is to provide a structure including a plurality of these interstitial members through which the mixture is forced, each member being preferably in the form of a cone, one constituent being removed from the upper portion of these cones, and the other being removed from the center of the innermost cone.

Another object of the invention is to provide a method separating the constituents of a mixture by forming a film of one constituent and passing the other constituent therethrough.

A further object of the invention lies in a novel structure and method whereby the film of oil moving upward on such an interstitial member is forced or drawn into the treating space so as to be circulated therethrough in a manner to decrease short-circuiting tendencies.

Essentially, however, our process is not necessarily limited to the separation of two constituents of a mixture, for it also finds utility in collecting a liquid which may be dispersed or otherwise associated with another liquid of different density. In other words, it is possible by the use of our invention to gather and agglomerate into a single mass or stream droplets of oil or other primary liquid dispersed in or associated with another liquid of different density, such as the auxiliary liquid previously mentioned.

It is thus an object of this invention to provide a novel process of collecting one liquid in the presence of another, these liquids preferably being of different densities.

Further objects and advantages of the invention will be made evident hereinafter.

Referring to the drawings in which we have shown two forms of the invention as applied to two different types of electrical dehydrators,—

Fig. 1 is a sectional view of one type of dehydrating apparatus including our improved settling device.

Fig. 2 is a sectional view taken on the line 2—2 of Fig. 1.

Fig. 3 is an enlarged sectional view of the upper end of our settling device in conjunction with the inlet to the treating space.

Fig. 4 is a sectional view of another form of electrical treater incorporating our invention.

Fig. 5 is a sectional view taken on the line 5—5 of Fig. 4.

Fig. 6 is an enlarged view of the nozzle means shown in Fig. 4.

Fig. 7 is a diagrammatic view illustrating the use of a solid member to effect a separation.

Referring particularly to Fig. 1, we have shown a tank 10 including a base 11 and a cover 12, these members defining a chamber 13, there being a dry oil discharge pipe 14 communicating with the upper end of this chamber and a water discharge pipe 15 communicating with the lower end thereof.

Suspended in this chamber on an insulator 16 is an upper conical electrode 17 which in this case is the live electrode, being supplied with a high potential alternating current by a conductor 18 connected to one terminal of a secondary of a transformer 19, the other terminal of this secondary being grounded to the tank 10 in the usual manner. The upper conical electrode 17 cooperates with a lower grounded electrode 21 in defining a treating space 22, as best illustrated in Fig. 1. This grounded electrode is supported inside and electrically connected to the tank 10 by brackets 23 and is of smaller diameter than the tank 10 so as to provide a discharge space 24 around the periphery thereof.

Communicating with the central portion of the treating space 22 is a sleeve 26 secured to the grounded electrode 21. Extending into a throat 27 of this sleeve is an intake pipe 28 which extends outside the tank 10 and which is supplied with the emulsion to be treated by a suitable pumping means, not shown. The emulsion passing through the intake pipe 28 is discharged into the sleeve 26 by a nozzle 29, this emulsion then passing outward through the electric field set up in the treating space 22 wherein the emulsion is broken.

When the treated emulsion leaves the outer portion of the treating space 22 it drops through the discharge space 24 and into the settling space 30 formed in the tank 10 between the grounded electrode 21 and the base 11. In the conventional dehydrator, this treated emulsion is allowed to settle in the settling space and tends to stratify, forming a body of dry oil above the oil level 31, shown in Fig. 1, and a body of water below the water level 32 shown in this figure, there being a body of loose emulsion between these two levels. The oil and water levels 31 and 32 are, of course, not distinctly defined, but exist substantially in the positions shown, it being understood that these levels may be varied by controlling the relative amounts of oil and water leaving the tank through the pipes 14 and 15.

Disposed in the settling space 30 is a plurality of nested interstitial members 40 each of which is preferably conical in shape and supported a slight distance above the base 11 by any suitable means such as brackets 41, so as to provide a collecting space 42 between the lower edges of these members and the base 11 through which any mud entrained in the emulsion may pass in moving toward the pipe 15. As will be seen from Fig. 1, each of these interstitial members is disposed with its apex upward so as to provide an inclined interstitial surface.

Referring particularly to Fig. 2, the upper ends of these interstitial members are spaced a small distance from the periphery of the pipe 28 so as to form an annular space 44, there being brackets 45 extending across this space and in clamping relationship with the pipe to firmly support the upper ends of these members.

These interstitial members are preferably formed of screen, and a material is selected for this screen which is preferentially wetted by the oil so that when the treated emulsion enters the settling space 30 and is forced toward the outermost interstitial member 40, the oil tends to associate itself with the preferentially oil wetted interstitial member in a manner to form a film of oil therealong. Any additional oil which comes adjacent this film is also agglomerated thereto, the net result being that this film of oil is increased in thickness and rises along the interstitial member due to the fact that the density of this oil is less than the density of the surrounding auxiliary liquid. The upward movement of this dry oil is also facilitated by the capillary action of the interstices of this member, and by proper design, it is also possible to cause the incoming mixture to move in such a direction that the oil separated therefrom is moved upward along the interstitial member due to a force component of the incoming mixture.

The water associated with the mixture is forced through this film of oil rising along the outermost interstitial member 40, and our experiments have shown that this water will pass through the film by temporarily rupturing the film, this rupture being immediately healed, and that the water has little or no tendency to carry oil particles therewith in passing through the interstitial member.

It is entirely possible to use a single interstitial member for separating the oil and water, but in this event all of the separation must take place adjacent this member. This requires a relatively slow movement of the mixture and this decreases the capacity of the separator. It is thus usually preferable to utilize a plurality of these interstitial members and force the treated emulsion therethrough at a rate greater than that which would be effective in completely separating the oil from the water, relying upon the inner interstitial members to complete the separation. In this case it is not necessary that films of oil be formed over each interstice, for whatever portion of the mixture is not broken in going through the outermost interstitial member will be separated by the inner members.

Regardless of whether one or a number of interstitial members 40 are used we have found it desirable to so position these members that the oil rising therealong will be discharged from the upper terminal portion thereof into the sleeve 26 and will thus be recirculated through the treating space 22, separation of this dry oil from the treated emulsion taking place between the outer edge of this live electrode and the tank 10, this dry oil rising as indicated by the arrow 45. This flow of dry oil from the outermost interstitial member 40 is best shown in Fig. 2, and the dry oil rising from the inner interstitial members engages the periphery of the intake pipe 28 and moves upward therealong through the annular space 44 as indicated by the arrows 46.

The interstitial members which we prefer to use when separating a mixture of treated petroleum emulsion are formed of brass screen, and very successful results have been obtained by the use of #12 mesh. Brass has the property of being preferentially oil wetted, as do also certain other materials known in the art and it should thus be understood that we are not limited to the use of brass screen, the controlling factor being that these members be preferentially wetted by one of the constituents of the mixture, in this case the oil. However, it is not necessary that the entire mass of the interstitial members be formed of a preferentially oil wetted material, for it is only the surfaces of these interstitial members which are effective. Thus, it is sometimes preferable to utilize a screen or interstitial member of any metallic material, and to suitably modify the metallic surface thereof by any suitable means which will cause these surfaces to be preferentially oil wetted. For instance, certain metallic surfaces can be modified by coatings, as, for example, by imparting thereto a sulphide coating. In certain instances such coatings are even more effective than the bare metal itself, and it should thus be understood that these coatings fall within the scope of this invention. Another advantage of these coatings is that they are often more resistant to corrosion than is the plain metal itself.

Our process and apparatus is not limited in utility to the particular embodiment shown nor to a combination with an electric treater. It is entirely possible to utilize our method in agglomerating particles of any liquid which is suspended in any other liquid, the latter liquid usually being of a different density than the former. In such an instance it is only necessary to place one or more members in the path of travel of the droplets through the surrounding liquid, and to form this interstitial member of such material, or with such a coating that it is preferentially wetted by the liquid forming the droplets rather than by the other liquid. By inclining this member the droplets agglomerate thereon and form a film which moves therealong due to the fact that the density of the liquid forming this film is different from the surrounding liquid. As an illustration of this method, consider that particles of dry oil are introduced into the body of auxiliary liquid. Inasmuch as the interstitial members are preferentially oil wetted the oil will form a film thereon and will move upward due to the fact that the density thereof is less than that of the auxiliary liquid. It is not necessary, however, that the liquid to be agglomerated be of a density less than the surrounding liquid. The opposite condition might be true, in which case the stream of agglomerated liquid would move downward on the interstitial member rather than upward therealong.

It should be understood that the levels 31 and 32 shown in Fig. 1 are merely arbitrary, and that the oil level 31 might, if desired, be raised, and the oil level 32 lowered below that shown in this figure. The liquid between these two levels is, as previously stated, of varying composition, and that toward the upper end thereof may constitute a water-in-oil emulsion, while that near the lower end thereof may be a loose oil-and-water emulsion. Apparently, however, the interstitial members are effective with either type of emulsion, provided, of course, that these emulsions are not too tight. Best results have been obtained when the dispersed particles range in size from a fraction of a millimeter to one-half inch in diameter, although it is possible to utilize the process with sizes of particles which vary from these limits.

Furthermore, in some instances it is not necessary to use interstitial members. By properly inclining a solid member which is preferentially wetted by one of the constituents to be separated, the particles of this constituent agglomerate thereon and allow the other constituent to separate therefrom without causing this second constituent to pass through the film of the first constituent formed on the member. Thus, if a loose mixture of oil-and-water is brought into contact with the lower surface of the inclined member, such as indicated by the numeral 50 of Fig. 7, and if this member is preferentially wetted by oil, this oil will tend to agglomerate thereon and will move upward in a film as indicated by the arrow 51 due to the fact that the density thereof is less than that of the surrounding mixture. This frees the water which will then settle and agglomerate more rapidly than it otherwise would, due to the fact that the density thereof is less than the density of the surrounding mixture, and due to the fact that the films of the emulsifying material which may still be considered as surrounding each dispersed particle are broken when the particles are agglomerated on the inclined member.

In Figs. 4, 5, and 6 we have shown our settling device in combination with a different type of electric dehydrator wherein the live electrode is in the form of a sleeve 60 concentric with and surrounding a grounded central electrode 62, which is a continuation of the intake pipe 28, the upper end being closed by a plug 63, and the walls thereof being perforated, as indicated at 64, to permit the incoming emulsion to pass outward therethrough. A nozzle in the form of a cup 65 is provided around the openings in this pipe, and acts to direct the incoming emulsion in a stream surrounding the grounded electrode 62, as indicated by the arrows 66 of Fig. 6. Very desirable results are obtained by the use of such a treater, these results being set forth in a copending application of Harmon F. Fisher, Serial No. 135,804, filed September 16, 1926. The principal advantage of this type of electrode, as far as the present application is concerned, lies in the fact that an electric field is formed between the outermost interstitial member 40 and a skirt 67 formed on the lower end of the sleeve electrode 60, as best indicated in Fig. 4. The oil rising along this outermost interstitial member is thus subjected to the action of an electric field as it nears the upper end thereof. This is advantageous, especially when a plurality of nested interstitial members are utilized. As previously mentioned, when a plurality of these interstitial members are utilized, it is not necessary that a complete separation take place at the outermost member; thus, certain of the unseparated constitutents pass therethrough. If, as sometimes happens, the mixture contains small bodies of emulsion, this emulsion rises with a stream of oil due to the fact that the density thereof is close to that of the oil. The electric field formed between the lower edge of the sleeve electrode 60 and the outermost interstitial member is thus effective in breaking any emulsion which is carried upward in the oil stream. It should be understood that this is an extreme condition, and that by proper manipulation, and proper design of the interstitial members substantially no emulsion or water is carried upward in the oil stream.

We claim as our invention:

1. A method of separating agglomerated particles of water from an oil, which includes the steps of: forming a film of said oil; bringing said particles of water and said oil into contact with said film, whereby said oil unites with said film and said water passes through said film; moving the oil in said firm upward and away from said film in the form of an oil stream; collecting the oil in said oil stream; and collecting said water after it is discharged through said film.

2. A method of separating a mixture of a lighter and a heavier constituent by means of an interstitial member preferentially wetted by the lighter of said constituents, which method includes the steps of: at least partially submerging said interstitial member in an auxiliary liquid of greater density than said lighter constituent and in an upright position; bringing said mixture into contact with said interstitial member through said auxiliary liquid, whereby said lighter constituent forms a film therealong and moves upward therealong due to its being lighter than said auxiliary liquid; forcing said heavier constituent through said film of said lighter constituent; and collecting said heavier and lighter constituents at different points, said lighter constituent flowing from the upper end of said interstitial member.

3. A method of separating a mixture of a primary and a secondary liquid, the former having a density lower than the latter, which method includes the steps of: submerging a member which is preferentially wetted by one of said liquids in a body of an auxiliary liquid having a density intermediate the densities of said primary and said secondary liquids; introducing said mixture into said body of auxiliary liquid and into contact with one side of said member, whereby said one of said liquids attaches itself to said member and forms a film moving therealong, due to the difference in density between said one of said liquids and said auxiliary liquid, thereby freeing the other of said liquids; moving one of said liquids from the upper end of said member; and collecting the other of said liquids at a position on the opposite side of said member.

4. In an electric dehydrator, the combination of: electrodes forming a treating space; means for passing an emulsion through said treating space, the water particles of said emulsion being therein agglomerated; a preferentially oil-wetted inclined interstitial member spaced from said treating space against which the treated emulsion is forced after leaving said treating space; and means for conducting water from the lower side of said inclined member, said oil in said treated emulsion flowing along said preferentially oil-wetted interstitial member and from the upper end thereof.

5. In an electric dehydrator, the combination of: electrodes forming a treating space; means for passing an emulsion through said treating space, the water particles of said emulsion being therein agglomerated; an inclined interstitial member coated with a film of oil and against the outer surface of which the treated emulsion is forced after leaving said treating space whereby the oil phase of said emulsion unites with said oil film and the water phase moves through said oil film; means for conducting the dry oil from the top of said inclined member into said treating space; and means for conducting water from the lower side of said inclined member.

6. In an electric dehydrator, the combination of: electrodes forming a treating space; means for passing an emulsion through said treating space, the water particles of said emulsion being therein agglomerated; a series of telescoping interstitial members, the outermost member communicating with the treated emulsion leaving said treating space, the oil in said treated emulsion rising along said interstitial members in the form of films, said water particles moving through said films; and means for withdrawing water from the interior of the innermost member.

7. A combination as defined in claim 6 in which said interstitial members are in the form of concentric cones with apices upward.

8. In an electric dehydrator for treating petroleum emulsions of oil and water the combination of: walls defining a treating space in which an electric field is established; a separating means below said treating space and comprising one or more interstitial members which are formed of an oil-wettable material and on which the oil collects and moves upward to form a stream of dry oil moving into said treating space; and means for introducing the emulsion to be treated into said treating space, at least a portion of the treated emulsion being thereafter acted upon by said separating means in a manner to separate the oil from the water to form said stream of dry oil.

9. A combination as defined in claim 8 in which said separating means comprises one or more sloping members preferentially wetted by said oil in said emulsion.

10. In combination in a device for separating a mixture of dissimilar liquids: a series of conical superimposed interstitial members formed of a material preferentially wetted by one of said liquids; means for delivering said mixture to the outermost of said interstitial members and forcing it successively through these members whereby said one of said liquids tends to associate itself with said members and form films flowing therealong; and means for withdrawing the other of said liquids from the interior of the innermost conical interstitial member.

11. In combination in a device for separating oil and water: an upright metallic wall formed of screen and having a surface formed of a substance which is preferentially wetted by oil and providing an upper oil-submerged terminal portion; means for moving a mixture of oil and water into contact with said wall, said oil associating itself with said wall and forming an upward moving film thereon through which said water passes, said oil moving upward in said film and flowing from said upper terminal portion; and means for withdrawing said water from the vicinity of said wall after it moves therethrough.

12. A method of separating agglomerated particles of water from an oil phase, which method includes the steps of: wetting a preferentially oil-wetted interstitial member with oil to form an oil film substantially covering the interstices; bringing the particles of water and said oil into contact with said oil film whereby said oil unites with said film and said water moves therethrough; moving said oil film along said interstitial member and from the uppermost part thereof in the form of a stream of oil; collecting said oil; and collecting the water particles moving through said oil film.

13. A method of separating a petroleum emulsion into its constituent oil and water phases, which method includes the steps of: agglomerating the water particles of said emulsion into larger masses; providing stratified bodies of said oil, said water and an intermediate stratum of bottom settlings composed of both oil and water in the process of settling; positioning a preferentially oil-wetted interstitial member in said stratum of bottom settlings and coated with a film of oil; bringing the mixture of agglomerated water particles and oil into contact with said member whereby said oil in said mixture associates itself with said film of oil and moves upward along said member; moving said agglomerated water particles through said film of oil; collecting said water particles moving through said oil film; and moving a stream of oil from the upper portion of said oil film.

14. A method of separating a mixture of oil and water by the use of an upright member which is preferentially wetted by oil, which method includes the steps of: forming stratified bodies of oil and water in the vicinity of said upright preferentially oil-wetted member with a body of a loose mixture of said oil and water therebetween, one end of said preferentially oil-wetted member extending into said body of oil and the other end extending into said body of water so that the intermediate section of said member extends through said body of loose mixture; bringing the mixture to be separated into the vicinity of said preferentially oil-wetted member through said body of loose mixture whereby the oil in said mixture to be separated forms a film of oil in contact with said preferentially oil-wetted member and which flows by gravity along said member and into said body of oil due to a difference in density between said oil and said loose mixture; collecting the remaining water droplets in said body of water into which said member extends; removing oil from said body of oil; and removing water from said body of water, said oil and water being removed at such rate that the opposed ends of said member remain respectively in said bodies of oil and water.

15. A method of separating an emulsion of oil and water, which method includes the steps of: treating said emulsion to coalesce the water droplets into larger masses, thus forming a treated mixture; positioning in a body of said treated mixture a preferentially oil-wetted member carrying a film of said oil; moving the treated mixture to be separated into the vicinity of said preferentially oil-wetted member to cause the oil in said treated mixture to unite with said film of oil whereby the oil in said oil film moves upward along said member due to its being of lower density than the mixture in which said member is positioned; moving the coalesced water masses through said member; collecting said coalesced water masses moving through said member; and moving a stream of said oil in said film from the upper end of said member.

16. In an electric dehydrator for treating emulsions composed of an oily material and water, the combination of: a tank the lower end of which comprises a settling zone; electrode means for establishing an electric field in said tank of sufficient intensity to coalesce the water droplets of said emulsion, the treated mixture moving to said settling zone; separating means in said settling zone for separating said water and said oily material and forming a stream of said oily material discharging into said electric field, said separating means including a member providing a surface which is preferentially wetted by said oily material whereby the oily material in said treated mixture becomes associated with said member and moves therefrom in the form of a stream to form said stream of oily material moving into said electric field and thus from said settling zone; and means for separately withdrawing said water and said oily material from opposite ends of said tank.

MURRAY E. GARRISON.
WILLIAM F. VAN LOENEN.

CERTIFICATE OF CORRECTION.

Patent No. 1,980,722. November 13, 1934.

MURRAY E. GARRISON, ET AL.

It is hereby certified that error appears in the printed specification of the above numbered patent requiring correction as follows: Page 4, line 39, claim 1, for "firm" read film; and that the said Letters Patent should be read with this correction therein that the same may conform to the record of the case in the Patent Office.

Signed and sealed this 8th day of January, A. D. 1935.

(Seal)

Leslie Frazer
Acting Commissioner of Patents.